Feb. 26, 1935.　　　　M. P. BONVALLET　　　1,992,688
VEGETABLE STALK CUTTER AND GRADER
Filed Sept. 23, 1932　　2 Sheets-Sheet 2

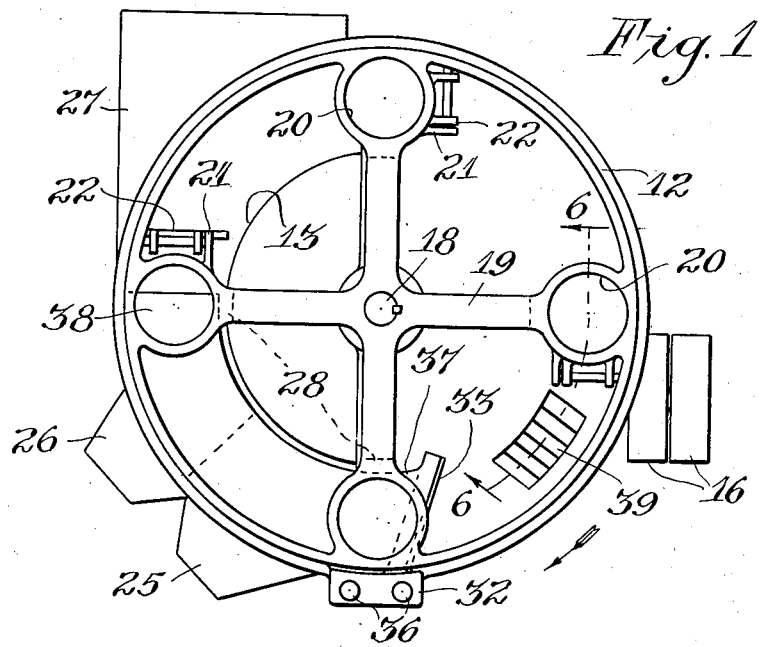
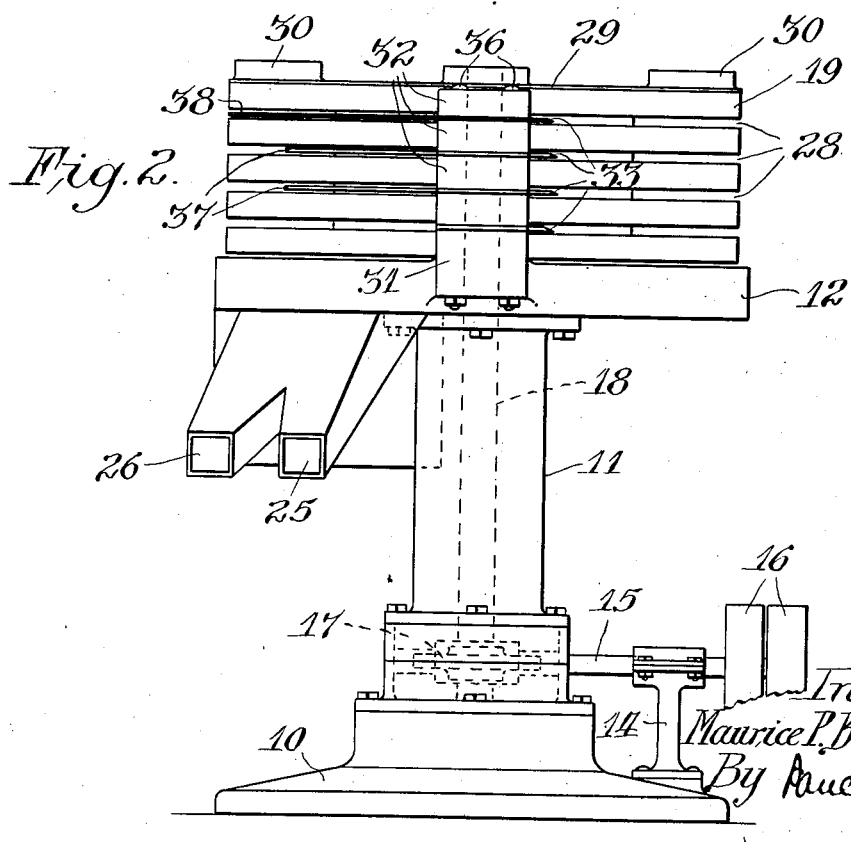

Inventor.
Maurice P. Bonvallet,
By Paul O. Pippel
Atty.

Patented Feb. 26, 1935

1,992,688

UNITED STATES PATENT OFFICE 1,992,688

VEGETABLE STALK CUTTER AND GRADER

Maurice P. Bonvallet, St. Anne, Ill.

Application September 23, 1932, Serial No. 634,509

13 Claims. (Cl. 146—165)

My invention relates to a machine for cutting vegetable stalk crops, such as asparagus, rhubarb and celery, into a predetermined number of cuts for each length of stalk, and for simultaneously grading or sorting the several cuts into segregated accumulations of like cuts.

Such cutting of each stalk into a number of cuts is required in the canning industry where different grades of a stalk crop are put up for the market. For instance, in the case of asparagus it is desirable to sever the stalk into four cuts as follows: the tip cut, two intermediate cuts, and a butt end cut, which latter usually represents waste.

In the past, conveyer types of machines have been employed in this connection, an operator having to lay the stalks in moving conveyer troughs that carry the same to the cutters disposed at the discharge end of the conveyer. Such machines, while commercially satisfactory, have proven costly and dangerous in use as they employ rotary knives to cut the stalks.

My present invention provides a machine of a different type in that it employs stationary knives which are not exposed and cannot cause physical injury to the hand feeders, the machine also being capable of cutting a bunch of stalks at one time instead of each stalk severally, thereby materially speeding up the rate of cutting.

With this general survey of the art, it is the primary object of my invention to provide an improved stalk cutting machine of the kind specified, which will be far simpler than machines now in use, and thereby cheaper to manufacture.

Another object is to provide such a machine employing stationary cutters that may operate on a bunch of stalks at one time to speed up the cutting operation, to save time and expense; the cutters being positioned where they cannot injure the operator feeding the stalks.

Still another object is to provide a novel structure for delivering the stalks to the stationary knives.

A further object is to provide a novel form of knife including means in the combination that serves to separate the several cuts of a stalk and to cause their discharge from the machine into segregated accumulations of like cuts.

Another important object is to provide an automatically acting tip alining means for the stalks so that uniform tip end cuts will result.

Other important objects will be apparent as the disclosure progresses. In the meanwhile these important objects of the invention may be achieved by the illustrative example of the invention herein chosen for purposes of this disclosure as the representation of one commercial, practicable form of the invention.

Briefly, in this selected form, the machine constructed in accordance with the principles of my invention, comprises an appropriate stand on which is carried a rotary head or drum that turns on a vertical axis and is provided with spaced, slotted ways into which projects a set of vertically spaced stationary, horizontally disposed knives. These knives cooperate with vertical pockets in the head that receive a loose bundle of stalks and carry the same to the knives so that the stalks will each be severed into a plurality of lengths or cuts, some of the knives including means for causing the severed lengths to be carried farther in the path of movement than certain other cuts. This makes it possible to discharge like cuts at the same points in the path of movement of the drum. At such points, chutes are located to receive the discharging cuts and direct them to segregated piles or in receptacles standing on the floor adjacent the machine. Means is also provided for automatically alining the stalks before they are cut. So much will suffice for the present, and attention is now directed to the accompanying sheets of drawings, in which:

Figure 1 is a top plan view of the machine, with a cover removed to illustrate interior parts;

Figure 2 is a side elevational view of the machine;

Figure 3:
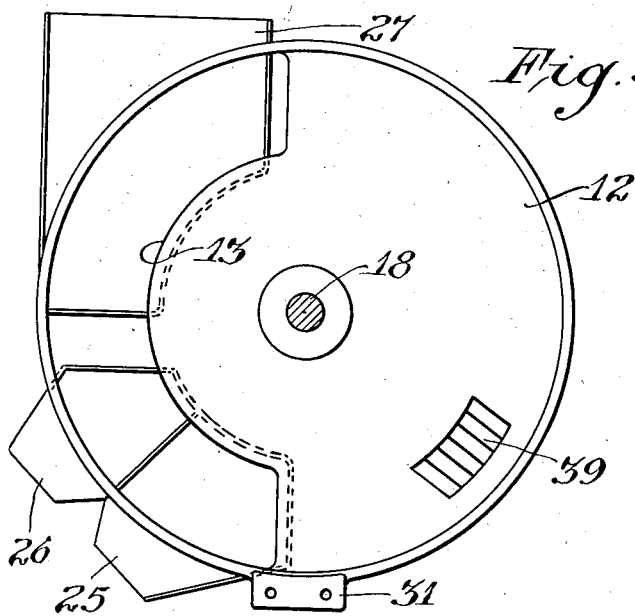
Figure 3 is a top plan view with the rotary head removed.

In one practicable, commercial form, the machine, as shown, includes a hollow base 10 carrying a tubular standard 11 on the upper end of which is carried a circular, horizontally disposed bed or plate 12 formed with a peripheral, arcuately shaped, marginal opening 13, extending approximately through a semi-circle in said plate.

To one side of the base 10 is a standard 14 in the upper end of which is appropriately journaled, a horizontally disposed shaft 15 adapted to be driven by a pulley wheel unit 16, said shaft passing into the hollow base portion to drive irreversible worm gearing indicated in dotted lines at 17, this gearing, in turn, driving a vertical shaft 18, disposed in the upright standard 11.

Said shaft 18 projects upwardly of the bed plate 12 and has keyed to it, to be rotated thereby a cylindrically shaped drum, or rotary head 19, said head being provided with a plurality of vertically disposed, circular pockets 20, these pockets being arranged along the periphery of the plate 12, in appropriate angular spacing, so that as the drum 19 turns these pockets travel directly over the arcuate opening 13 heretofore described.

Adjacent the bottom of each pocket 20 the wall forming said pockets, is formed with a small boss 21 to which is hingedly connected a trap door 22, the underside of which is formed with a cam shaped rib formation 23, said ribbing carrying remote from the door hinge, a loose roller 24. The purpose of these doors will later be described.

Carried beneath, and hung from the bed plate 12 are chutes 25, 26 and 27, disposed to catch the cut stalk portions, as hereinafter described, which fall through the arcuate opening 13, and at particular points therealong, to be received and directed by the several chutes or spouts to receptacles resting on the floor adjacent the machine.

The rotary drum or head 19 is cylindrical, as has been described, and may be formed as a one-piece casting, if desired, having radially extended, spaced slots 28 formed therein to extend from the circumference thereof, all the way around, and inwardly toward the radius of the circle and through each of the vertical pockets 20. The open top side of the drum 19 is covered by a circular plate 29, having short, circular sleeve extensions 30 to surround holes that register with the pockets 20. This plate or cover 29, of course, turns with the drum 19.

The outside edge of the bed plate 12 is formed with a boss 31 carrying a series of vertical or superimposed blocks 32, as shown in Figure 2, said blocks being spaced apart by knives or stationary cutters 33, each knife having an ear 34 (see Figures 7, 8 and 9) and bolt holes 35 to line up with registering holes in the boss 31 and blocks 32, so that bolts 36 may be dropped through the assembled structure to hold the parts together, and secure the knives in proper position so that they will be located in the slots 28 of the drum 19 and extend tangentially inward with respect to the drum so their cutting edges will present an obliquely disposed knife to stalks held in the pockets 20 and moved thereby against the knives. The oblique disposition of the knives just described, and best shown in Figure 1, makes for a good shearing or cutting action, as will later more fully appear.

Figure 7:
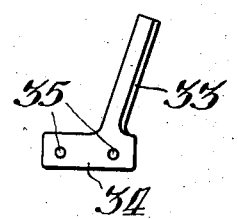
Figures 7, 8 and 9 are detail plan views of the various stationary knives or cutters, employed.
Figure 8:
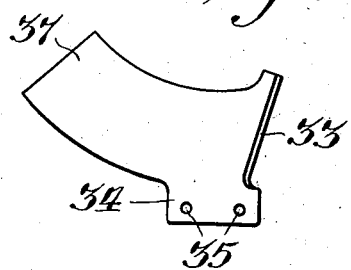
Figure 5:
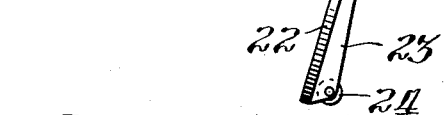
Figure 5 is a bottom view of the trap door.

As shown in Figure 2, the bottom-most knife 33 is narrow and of a kind shown in Figure 7, while the two intermediate knives 33 are of the kind shown in Figure 8, where it will be seen the knife has a long, horizontal, arcuately disposed tail 37 extending clockwise from the blocks 32 to a point over the chute 26. The chute 25 is nearest the knife holders 32, it is to be noted, in the respect mentioned. Further, the top-most knife 33 is like that shown in Figure 9 and has a still longer horizontal, arcuately disposed tail 38 which terminates at a point above the farthest chute 27.

Figure 6:
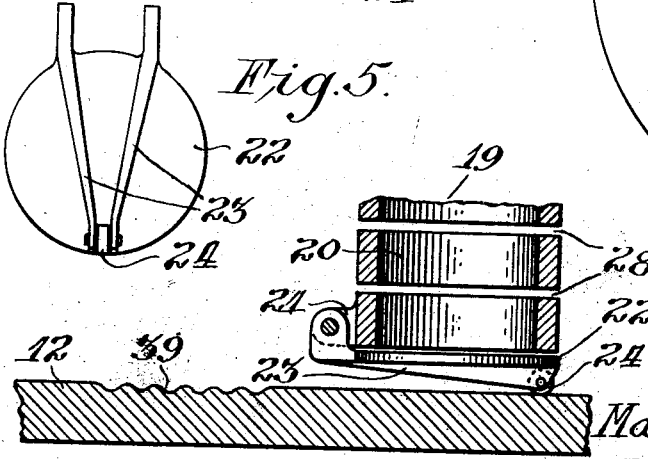
Figure 6 is a detail sectional, side view, as seen along the line 6—6, appearing in Figure 1.

As shown in Figures 1, 2 and 6 the plate 12 has a portion of its top surface corrugated at 39 a short distance clockwise of the knife boss 31 for a purpose presently to appear. All of the structural parts of the machine have now been described and the operation and function of the assembly will next be set forth.

Belt power is applied to the pulley 16 to drive the gearing 17 and shaft 18 in a direction to cause clockwise rotation of the cylindrical drum or head 19, as indicated by the arrow in Figure 1. One or more persons, known as feeders, grasp a loose untied, bundle of asparagus stalks, let us say, and place them head ends first into any of the pockets 20, the raised portions 30 on the cover 29 surrounding each pocket serving as a guide. It is presumed the feeders will successively fill each pocket with stalks in the manner stated as the pockets pass or turn adjacent the point where the feeder stands next to the machine. Thus, the pockets carry a bundle of stalks head end down, and in vertical position across the top surface of the stationary plate 12. However, the stalk tips rest on the trap doors 22 closing the bottom open ends of the vertical pockets 20, when the roller 24 on each door rides rollingly over the plate 12, thus preventing dragging of the tip ends of the stalks across the stationary plate 12, to prevent damaging the stalks. As the pocket now approaches the vertical bank of spaced, stationary knives 33, the roller 24 on each door 22 must roll over the corrugations 39 in its path of movement, causing momentary, rapid vibration of the door automatically to aline or adjust the stalks in the pockets 30 that all tip ends will rest uniformly on the top surface of the door. This vibrating means insures then, that all stalk ends will be properly alined at their bottom ends just before they approach the knives 33.

Continuing the clockwise rotation of the head the pocket 20 with its alined stalks now reaches the knives 33 which are obliquely disposed to the oncoming bunch of stalks to cut them with a shearing action. Each stalk then will obviously be severed at as many points as there are knives; in the present machine four knives 33 being shown in Figure 2. Of course, the knife spacing, or the number of knives to be used, is optional and can be varied by providing different heads 19 of varying slot spacings 28. As the particular pocket 20 now has passed the knives 33, the stalks have been severed at four spaced points. The tip end of the asparagus in the form shown would be severed by the bottom knife 33 shown in Figure 2 and that portion below said bottom knife, and also that portion of the tip end immediately above said bottom knife but below the second knife (from the bottom up) would instantly clear the bottom knife 33 because it has no tail of the kind heretofore described. (See Figure 7.) At the same instant the door 22 of this same pocket 20 reaches the long arcuate opening 13 in the plate 12, the hinge end 21 of the door passing over the end of the opening (see Figure 1) first, so that instantly the roller 24 of this door passes said edge, the door by its own weight drops suddenly to cause these two cuts to be discharged through the opening 13, this discharging action of the tip cuts being timed to take place directly over the chute 25 so that these special tip ends will be directed to a segregated pile or receptacle of their own. Of course, if only one long tip cut is desired, then the bottom knife 33 would be eliminated.

The particular pocket continues to be carried around by the head, and those cuts of the stalks above the second from the bottom knife 33 will be carried along slidingly over the long tail 37 on the two intermediate knives 33 until they drop off the end of said tails through the still open trap door, and the opening 13, at a point directly over the second chute 26 which receives these two intermediate stalk cuts and directs them to their segregated pile or receptacle.

Figure 4:
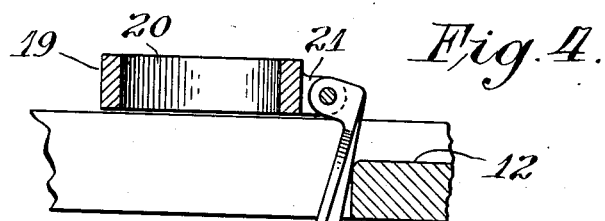
Figure 4 is a side detail, sectional view through the lower end of one of the stalk holding pockets, showing a trap door feature.
Figure 9:
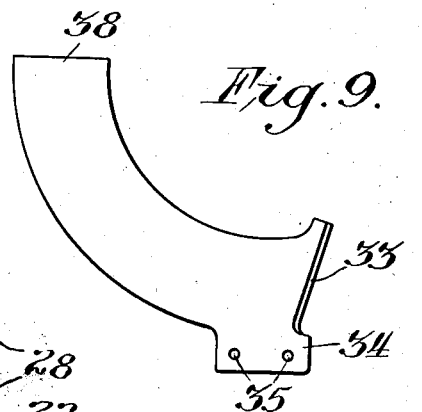

The tail 38 on the topmost knife 33 is the longest, as shown in Figures 1 and 9, and therefore the butt end cut above this knife will be dragged or carried farther in the angular distance of travel across such a long tail 38. Thus, when the butt ends, which by the way, in the case of asparagus, would be waste, drop off the end of the tail 38, they would fall through the still open trap door 22, and opening 13, to be caught by the chute 27 and separately accumulated. Continuing in this turning movement of the drum now, all cuts have been separated and left the machine, that is for the particular pocket 20 we have been discussing. Accordingly, now, the trap door cam 23, as shown in Figure 4 rides over the other end of the opening 13 automatically to return said trap door to closed position, such position being maintained while the roller 24 thereof rides over the solid portion of the plate 12, as will now be understood. And so on, for each pocket 20, the feeders successively filling each pocket, the drum head turning at better than a hundred revolutions per minute, so it can readily be seen that a rapid rate of stalk cutting and separation of different cuts into like groups occurs.

The irreversible worm gearing 17, of course, makes it impossible to drive the drum in the wrong direction so that injury to the parts of the machine cannot result. Also the knives 33 being stationary and in an inexposed position it is virtually impossible for the feeders to cut their hands, thus providing a great factor of safety compared with the type of cutter employing movable knives. Further, the machine is simple, foolproof, and capable of performing its work at a high rate as bunches of stalks are simultaneously cut at one time. Thus, it will be seen that all of the desirable objects heretofore recited are achieved by this invention.

Obviously, the machine may assume many forms and variations in practice from the example herein selected for illustration. It is, therefore, the intention to cover all such changes, alterations, and modifications which do not depart from the spirit and scope of my invention, as indicated by the following claims.

What is claimed is:

1. In a stalk cutter, a movable stalk carrying member including a vertical pocket for holding a bunch of stalks in erect position, a stationary horizontal knife in the path of movement of said member so that the knife severs the stalk, and means on the knife for supporting one cut of the stalk to be carried a distance by the carrying member and then discharged, while the other cut is discharged substantially immediately upon being cut.

2. In a stalk cutter, in combination, a bank of stationary horizontal knives spaced vertically apart with their cutting edges in substantially the same vertical plane, a movable member for conveying stalks in erect position to said knives to be severed simultaneously into a plurality of cuts, and means for causing differing cuts to be discharged at different points in the movement of the member and like cuts to be discharged at the same points.

3. In a stalk cutter a stationary plate, a rotary head carried thereabove and formed with means to carry stalks in erect position, a substantially horizontal knife carried adjacent said head and having its cutting edge disposed in the path of movement of said stalks, whereby said stalks are severed into several cuts, said plate having an elongated opening therein, the cut below the knife discharging from the machine through said opening substantially upon being cut, and means to cause the portion above the knife to be carried along temporarily and dropped through said opening at another point.

4. In a stalk cutter a stationary plate, a rotary head carried thereabove and formed with means to carry stalks in erect position, a substantially horizontal knife carried adjacent said head and having its cutting edge disposed in the path of movement of said stalks, whereby said stalks are severed into several cuts, said plate having an elongated opening therein, the cut below the knife discharging from the machine through said opening substantially upon being cut, and said knife having an elongated tail portion to support the portion of stalk above the knife, whereby the head carries that portion of the stalk along until it drops off the end of the tail to be discharged through said opening at another point.

5. In a stalk cutter, a rotary member, a bank of spaced stationary knives, said member having means for moving stalks against the knives to be severed, and means comprising supports of different lengths for causing different cuts to be discharged at different points of discharge, said machine discharging at a plurality of angularly spaced points.

6. In a stalk cutter, a rotary head formed with a plurality of spaced stalk receiving pockets, the stalks being held in substantially erect position, a plate beneath said head having an opening, a plurality of stationary knives arranged in spaced vertical relation and having cutting edges lying in substantially the same vertical plane and projected into the path of movement of said pockets to sever the stalks therein, said knives having horizontal widths of varying degrees to cause the stalk cuts disposed thereabove to be carried to different angular points in the rotation of the head and to be discharged through the plate opening in a manner to cause similar cuts to discharge at the same point.

7. In a stalk cutter, means to move a stalk in erect position along a circular path of movement, a series of spaced, horizontal, stationary knives in said path of movement to sever the stalk into a plurality of cuts, and tails on the knives of varying lengths, the topmost knife having the longest tail and the bottom-most knife having the shortest tail.

8. In a stalk cutter, means to move a bunch of stalks in erect position along a path of movement, a support for said means having an opening below said means, a series of spaced, substantially horizontal knives in said path of movement and having stalk cut supporting portions above said opening, said portions being longest in the uppermost knife and shortest in the lowermost knife.

9. In a stalk cutter, a table having an arcuate peripheral opening, a head rotatable above the table and provided with a pocket for carrying stalks erect, a bank of horizontal knives arranged in vertically spaced relation and having vertically alined cutting edges in the path of movement of the pocket, and horizontal supports extending one each from each knife arcuately over the arcuate peripheral opening, the length of said supports being staggered with the longest uppermost and the shortest bottom-most.

10. In a stalk cutter, a table having an arcuate peripheral opening, a head rotatable above the table and provided with a pocket for carrying stalks erect, a bank of horizontal knives arranged in vertically spaced relation and having vertically alined cutting edges in the path of movement of the pocket, horizontal supports extending one each from each knife arcuately over the arcuate peripheral opening, the length of said supports being staggered with the longest uppermost and the shortest bottom-most, and chutes leading from the arcuate opening arranged to catch stalk cuts falling off the supports.

11. In a stalk cutter, in combination, a bank of horizontal knives spaced vertically apart with their cutting edges in substantially the same vertical plane, a movable member for conveying stalks in erect position to said knives to be severed into a plurality of cuts, and horizontal members of different lengths adjacent the knives in superimposed spaced relation for supporting cut portions of the stalks located thereabove to be carried along by the movable member, said members being of different lengths with the longest on top and the shortest at the bottom, the cut portions falling off the ends of the respective members to be discharged at different points.

12. In a stalk cutter, a movable member including an upright stalk holding pocket, a hinged door at the bottom of the pocket to support the stalks, a knife for cutting the stalks in the pocket, a horizontal table over which said member moves, and means on the table engaged by the door for vibrating the door to aline the stalks before they are engaged by the knife.

13. In a stalk cutter, a movable member including an upright stalk holding pocket, a hinged door at the bottom of the pocket to support the stalks, a knife for cutting the stalks in the pocket, a horizontal table over which said member moves, a roller carrying the door on the table, and corrugations on the table over which the roller travels to vibrate the door to aline the stalks before they are engaged by the knife.

MAURICE P. BONVALLET.